United States Patent
Yano et al.

(10) Patent No.: US 10,033,214 B2
(45) Date of Patent: Jul. 24, 2018

(54) POWER SUPPLY-DEMAND ADJUSTING APPARATUS, POWER SYSTEM AND POWER SUPPLY-DEMAND ADJUSTING METHOD

(71) Applicant: NEC Corporation, Tokyo (JP)

(72) Inventors: Hitoshi Yano, Tokyo (JP); Ryo Hashimoto, Tokyo (JP); Hisato Sakuma, Tokyo (JP); Koji Kudo, Tokyo (JP); Eisuke Saneyoshi, Tokyo (JP); Takahiro Toizumi, Tokyo (JP)

(73) Assignee: NEC Corporation, Tokyo (JP)

(*) Notice: Subject to any disclaimer, the term of this patent is extended or adjusted under 35 U.S.C. 154(b) by 170 days.

(21) Appl. No.: 14/917,422

(22) PCT Filed: Aug. 26, 2014

(86) PCT No.: PCT/JP2014/072300
§ 371 (c)(1),
(2) Date: Mar. 8, 2016

(87) PCT Pub. No.: WO2015/041010
PCT Pub. Date: Mar. 26, 2015

(65) Prior Publication Data
US 2016/0226261 A1  Aug. 4, 2016

(30) Foreign Application Priority Data
Sep. 17, 2013 (JP) ................................. 2013-191607

(51) Int. Cl.
*H02J 7/00* (2006.01)
*G06Q 50/06* (2012.01)
(Continued)

(52) U.S. Cl.
CPC ........... *H02J 7/007* (2013.01); *B60L 11/1816* (2013.01); *B60L 11/1824* (2013.01);
(Continued)

(58) Field of Classification Search
CPC ..... H02J 7/007; H02J 7/0021; B60L 11/1861; B60L 11/1816; B60L 11/1844;
(Continued)

(56) References Cited

U.S. PATENT DOCUMENTS

2011/0218680 A1* 9/2011 Kim ......................... H02J 3/00
700/276
2013/0166080 A1* 6/2013 Furuta ................... G05B 15/02
700/286
(Continued)

FOREIGN PATENT DOCUMENTS

JP  2008-289250 A  11/2008
JP  4920123 B1  4/2012
(Continued)

OTHER PUBLICATIONS

International Search Report, Corresponding to PCT/JP2014/072300, dated Oct. 7, 2014, 1 page.
(Continued)

*Primary Examiner* — Nha Nguyen
(74) *Attorney, Agent, or Firm* — Wilmer Cutler Pickering Hale and Dorr LLP

(57) ABSTRACT

Acquisition unit 184 acquires an adjustment period in which power supply and demand is adjusted, and adjustment power which is power to be adjusted in the adjustment period. Adjustment target determining unit 185 requests an adjustment target storage battery to be charged or discharged at a predetermined electricity rate in the adjustment period and determines, based on the adjustment power, adjustment target storage batteries from among the storage batteries that have responded to the request. In the adjustment period, control unit 186 causes the adjustment target storage batteries to charge or discharge electricity at the predetermined electricity rate and causes a non-adjusted storage battery that is different from the adjustment target storage battery to
(Continued)

charge or discharge electricity at an electricity rate different from the predetermined electricity rate.

10 Claims, 18 Drawing Sheets

(51) Int. Cl.
*G06Q 30/04* (2012.01)
*B60L 11/18* (2006.01)
(52) U.S. Cl.
CPC ....... *B60L 11/1842* (2013.01); *B60L 11/1844* (2013.01); *B60L 11/1846* (2013.01); *B60L 11/1861* (2013.01); *G06Q 30/04* (2013.01); *G06Q 50/06* (2013.01); *H02J 7/0021* (2013.01); *B60L 2240/70* (2013.01); *Y02E 60/721* (2013.01); *Y02T 10/705* (2013.01); *Y02T 10/7005* (2013.01); *Y02T 10/7044* (2013.01); *Y02T 10/7072* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 10/126* (2013.01); *Y04S 30/14* (2013.01); *Y04S 50/12* (2013.01)

(58) Field of Classification Search
CPC .............. B60L 11/1824; B60L 11/1846; B60L 11/1842; B60L 2240/70; G06Q 30/04; G06Q 50/06; Y02T 90/14; Y02T 90/128; Y02T 10/7072; Y02T 90/169; Y02T 10/705; Y02T 90/121; Y02T 10/7044; Y02T 90/163; Y02T 10/7005; Y02T 10/7291; Y02T 90/16; Y04S 30/14; Y04S 10/126; Y04S 50/12; Y02E 60/721
See application file for complete search history.

(56) References Cited

U.S. PATENT DOCUMENTS

| | | | |
|---|---|---|---|
| 2014/0253037 A1* | 9/2014 | Yano | B60L 11/1838 320/109 |
| 2014/0379151 A1* | 12/2014 | Tokuda | H02J 3/32 700/287 |
| 2015/0249350 A1* | 9/2015 | Tomita | H01M 10/441 320/107 |
| 2016/0086292 A1* | 3/2016 | Satomi | G06Q 50/06 705/412 |
| 2016/0125339 A1* | 5/2016 | Itaya | G06Q 50/06 705/7.25 |
| 2016/0202682 A1* | 7/2016 | Matsumoto | G06Q 50/06 700/291 |

FOREIGN PATENT DOCUMENTS

| | | |
|---|---|---|
| JP | 2012-095455 A | 5/2012 |
| JP | 2014-217195 A | 11/2014 |
| WO | WO-2011/122374 A1 | 10/2011 |
| WO | WO-2012/120977 A1 | 9/2012 |
| WO | WO-2013/008934 A1 | 1/2013 |

OTHER PUBLICATIONS

Japanese Office Action issued by the Japan Patent Office for Japanese Application No. 2015-537617 dated Apr. 3, 2018 (4 pages).

\* cited by examiner

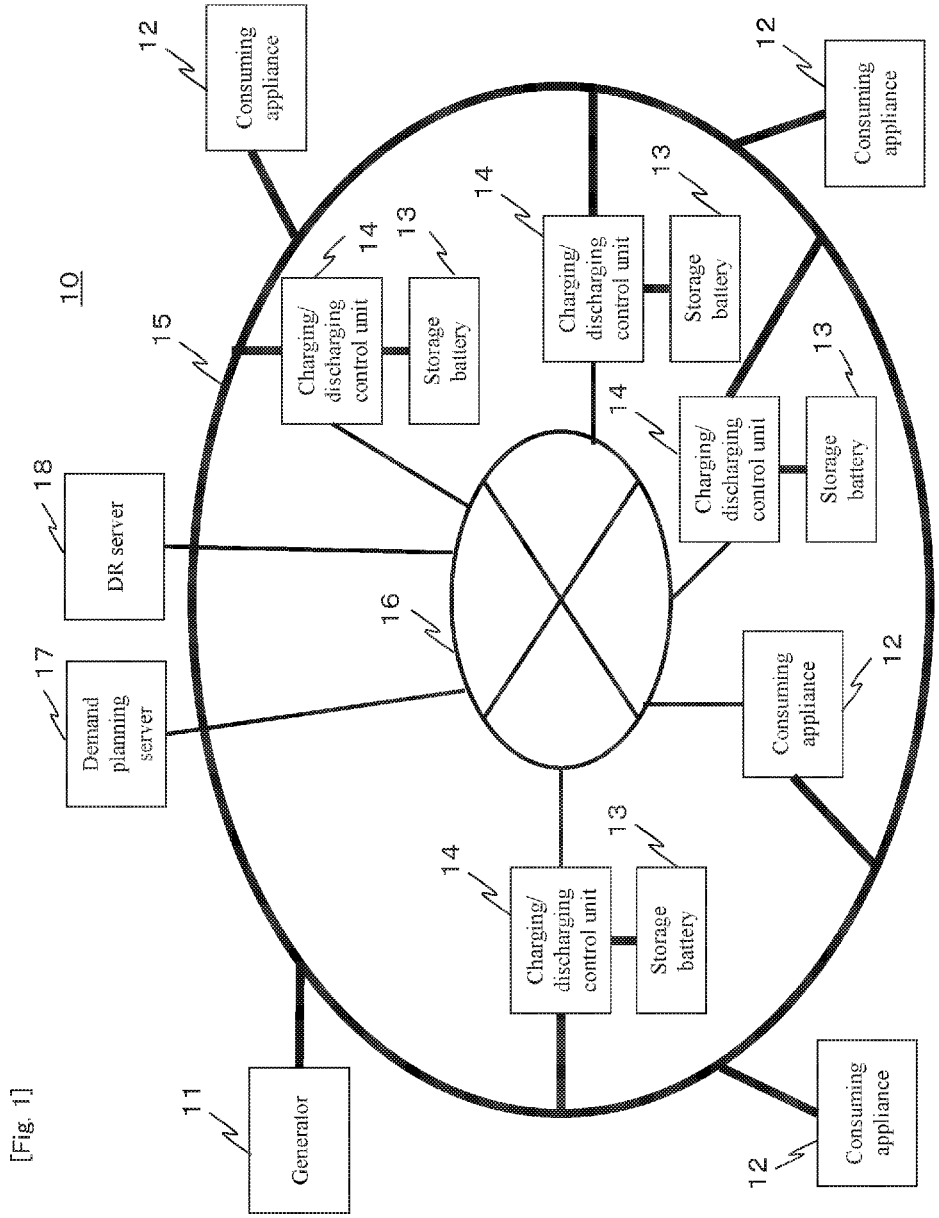
[Fig. 1]

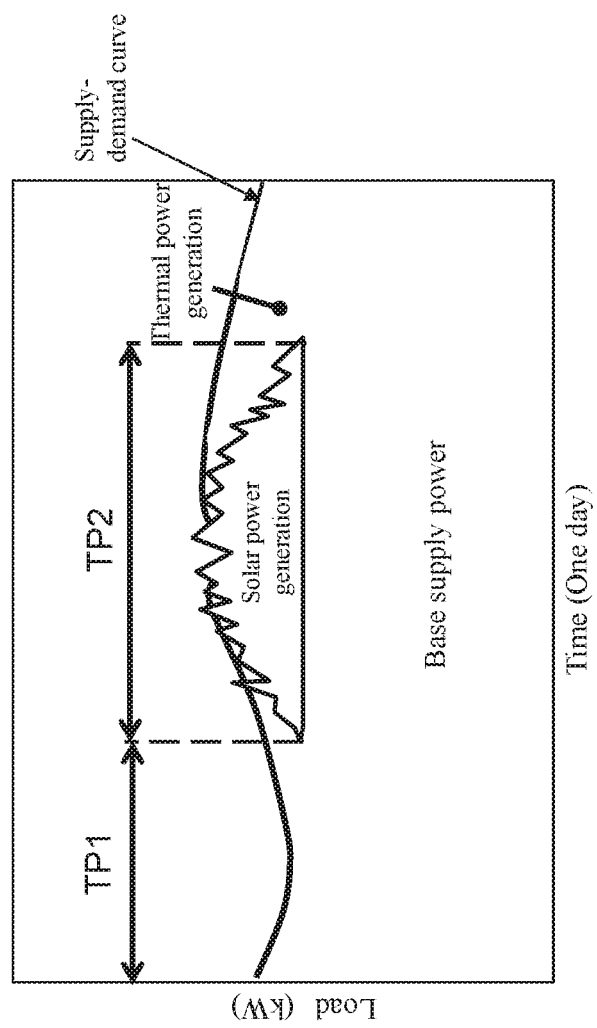
[Fig. 2A]

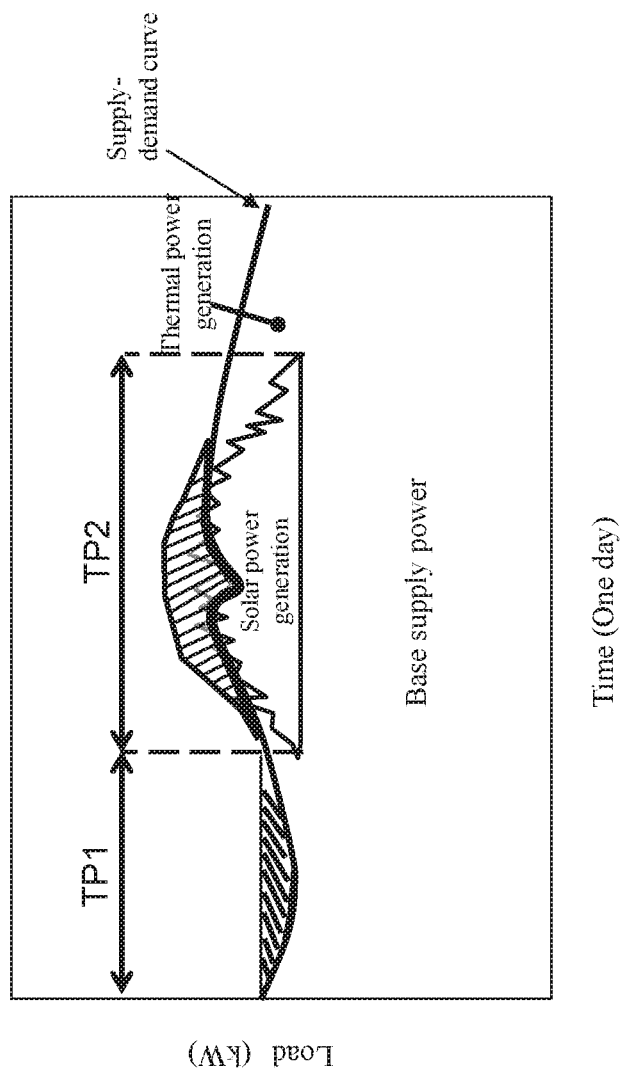
[Fig. 2B]

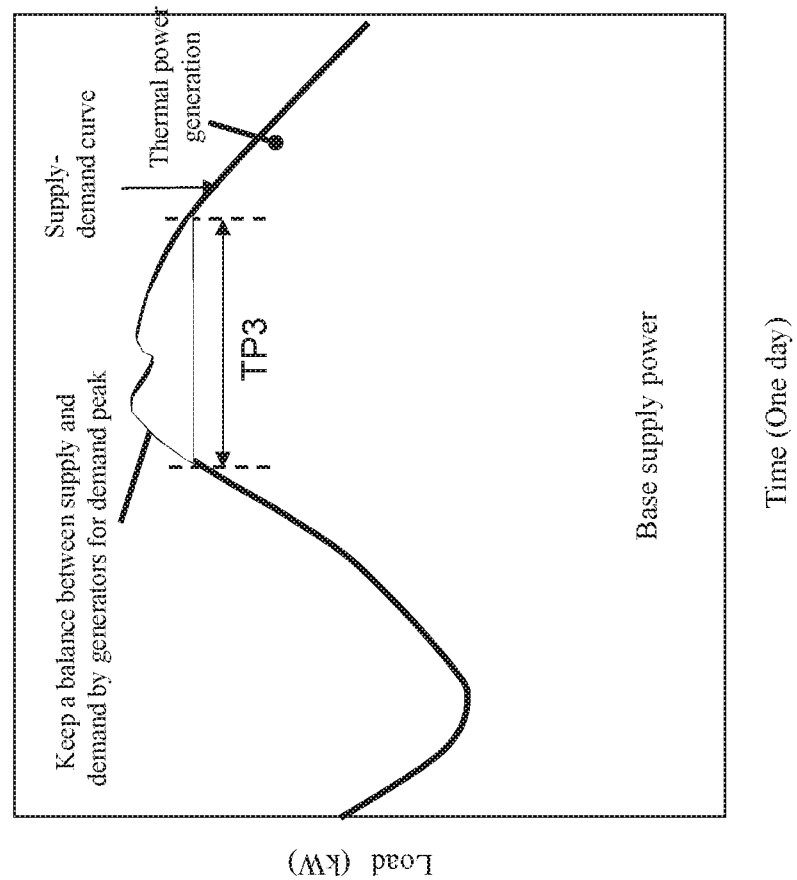
[Fig. 3A]

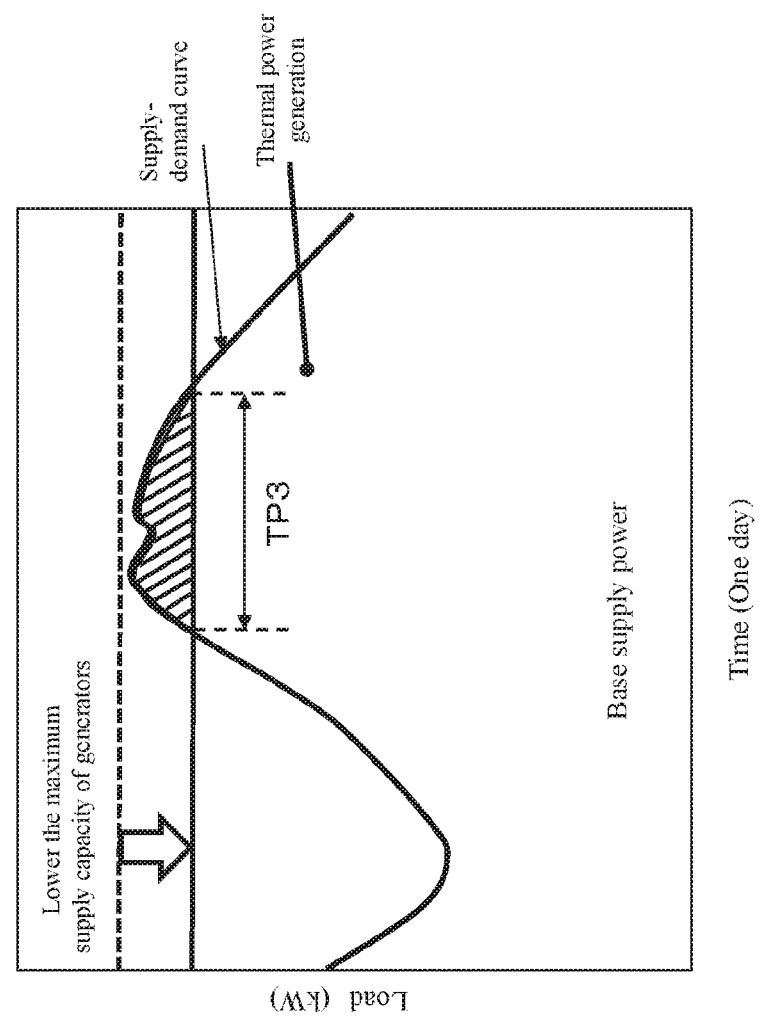
[Fig. 3B]

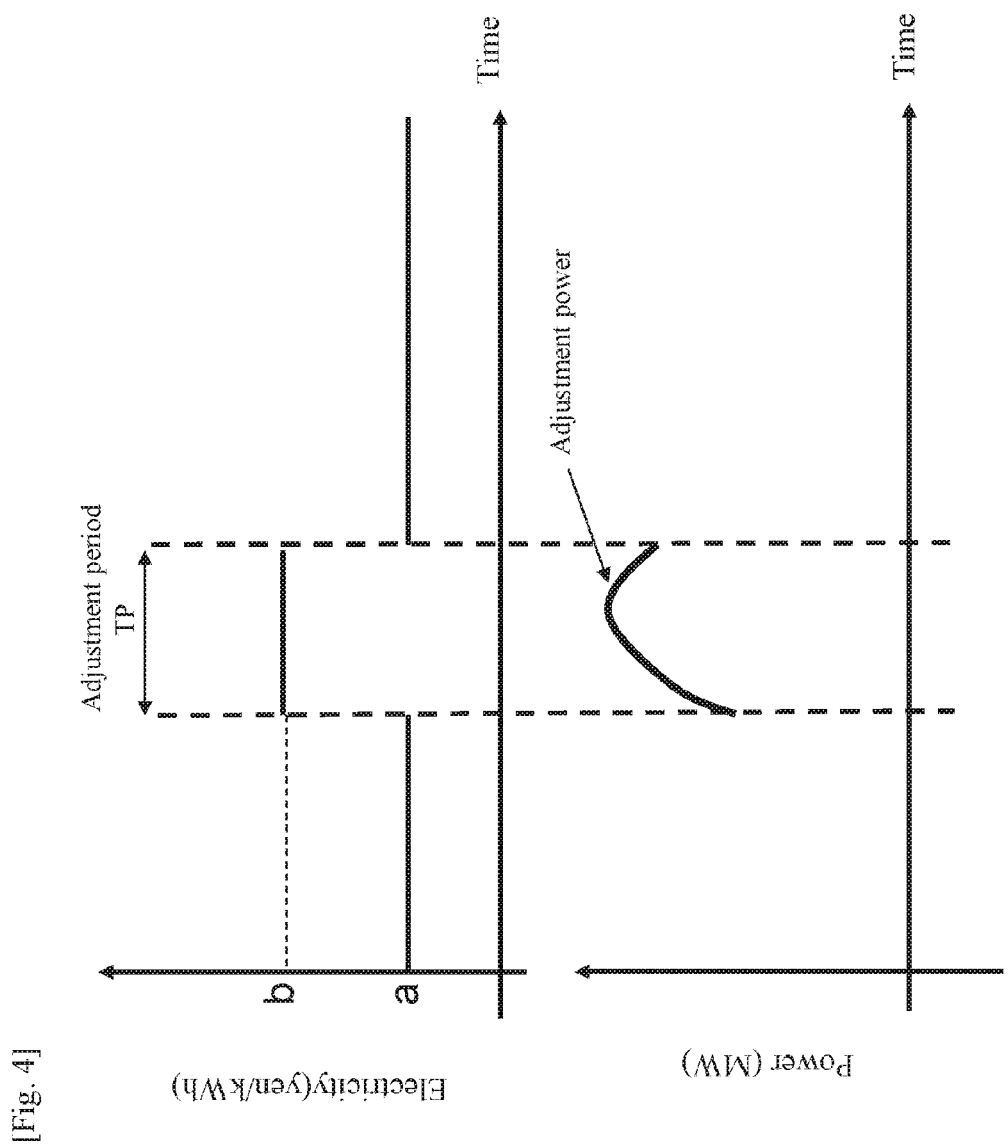
[Fig. 4]

[Fig. 5]
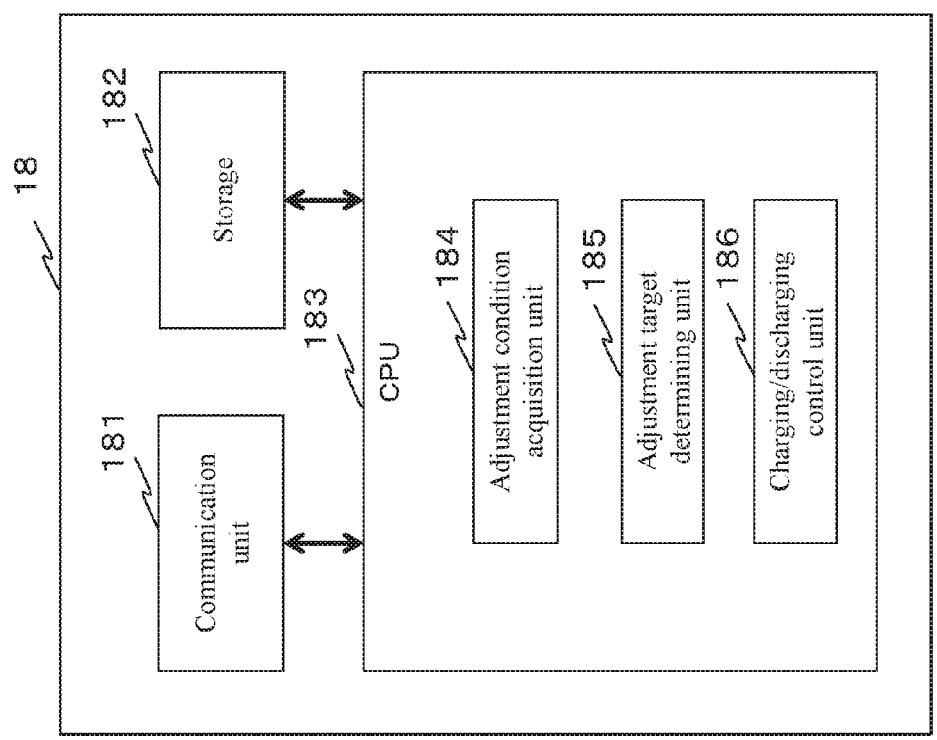

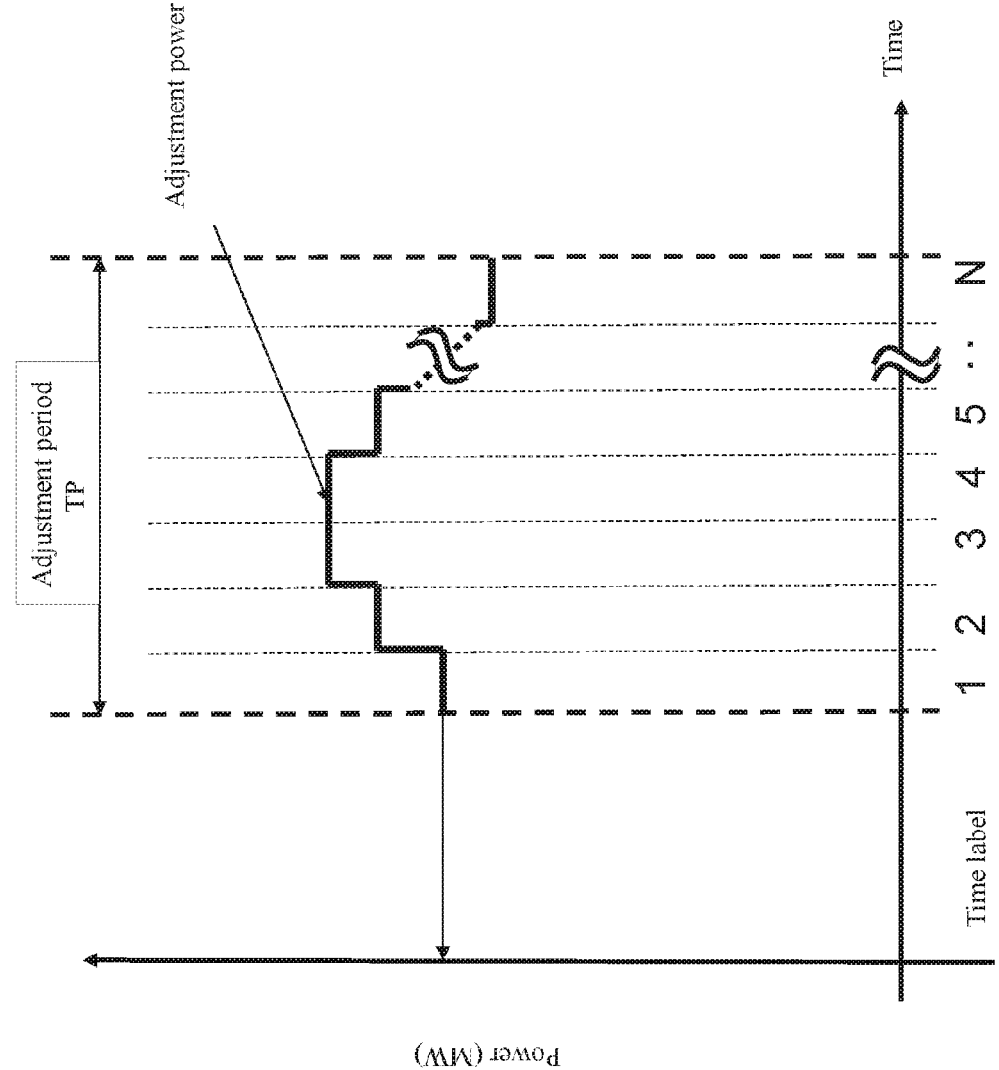
[Fig. 6]

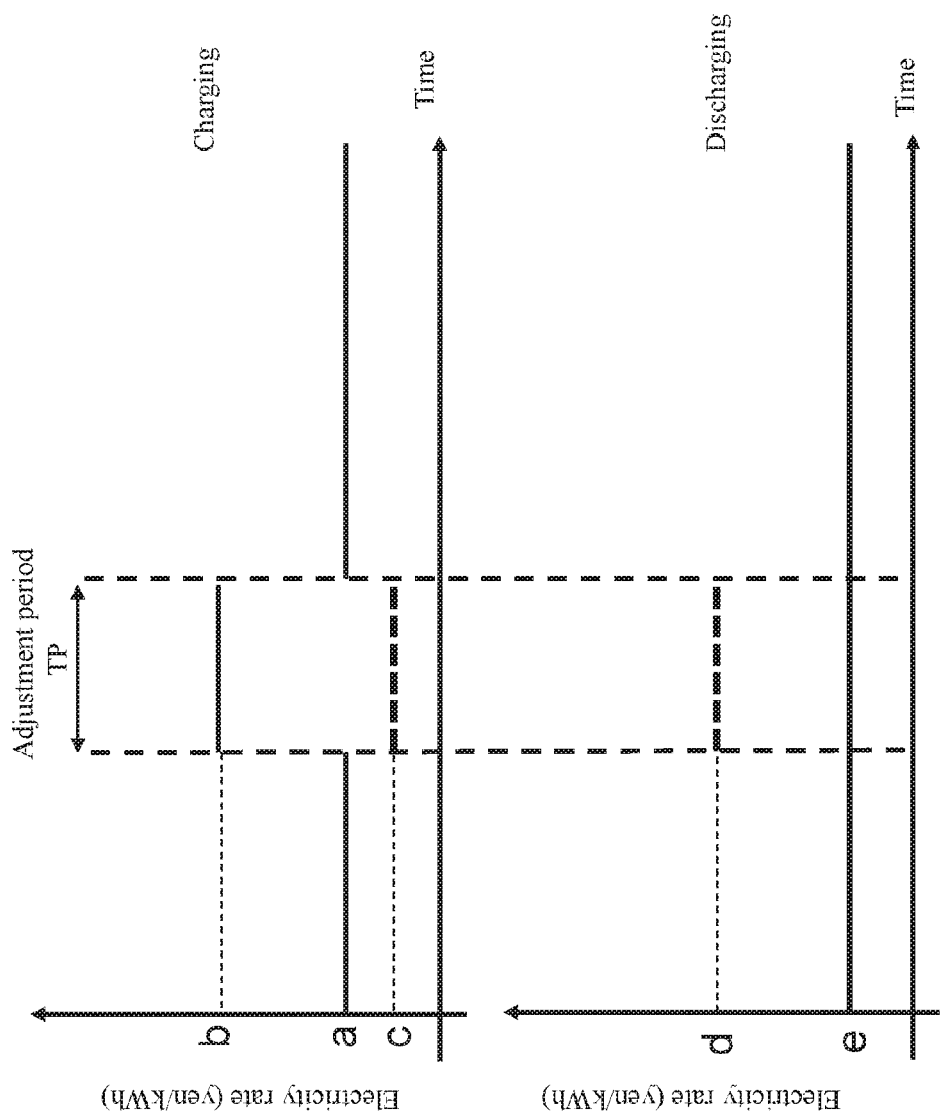
[Fig. 7]

[Fig. 8]

| Time label | Period | Electricity rate (yen/kWh) | Adjustment power (MW) |
|---|---|---|---|
| 1 | 12:00-12:20 | 5 | 0.9 |
| 2 | 12:20-12:40 | 5 | 1.1 |
| 3 | 12:40-13:00 | 5 | 2.4 |
| 4 | 13:00-13:20 | 5 | 2.4 |
| 5 | 13:20-13:40 | 5 | 2.0 |
| : | : | : | : |
| N | 15:20-15:40 | 5 | 1.0 |

[Fig. 9]

| Time label\Order | 1 | 2 | 3 | 4 | 5 | 6 | ... | M |
|---|---|---|---|---|---|---|---|---|
| 1 | (LIB9, 1k) | (LIB2, 10k) | (LIB6, 2k) | (LIB23, 4k) | (LIB16, 3k) | (LIB34, 21k) | ... | Blank |
| 2 | (LIB9, 1k) | (LIB2, 10k) | (LIB6, 2k) | (LIB17, 5k) | (LIB16, 3k) | (LIB34, 2k) | ... | (LIB55, 10k) |
| 3 | (LIB9, 1k) | (LIB1, 3k) | (LIB7, 3k) | (LIB24, 10k) | (LIB16, 3k) | (LIB43, 4k) | ... | Blank |
| 4 | (LIB9, 1k) | (LIB1, 3k) | (LIB23, 100k) | (LIB24, 10k) | (LIB16, 3k) | (LIB43, 7k) | ... | Blank |
| 5 | (LIB9, 1k) | (LIB1, 3k) | (LIB3, 50k) | (LIB24, 10k) | (LIB19, 2k) | (LIB43, 5k) | ... | Blank |
| ... | ... | ... | ... | ... | ... | ... | ... | ... |
| N | (LIB8, 7k) | (LIB5, 5k) | (LIB13, 1k) | (LIB19, 2k) | Blank | Blank | ... | Blank |

Remarks: (ID, Charging power (W))

[Fig. 10]

| Label\Order | 1 | 2 | 3 | 4 | 5 | 6 | ... | M |
|---|---|---|---|---|---|---|---|---|
| 1 | (LIB9, 1k,5) | (LIB2, 10k,5) | (LIB6, 2k,4) | (LIB23, 4k,3) | (LIB16, 3k,3) | (LIB34, 21k,2) | ... | Blank |
| 2 | (LIB9, 1k,5) | (LIB2, 10k,5) | (LIB6, 2k,4) | (LIB17, 5k,3) | (LIB16, 3k,3) | (LIB34, 2k,2) | ... | (LIB56, 10k,0) |
| 3 | (LIB9, 1k,5) | (LIB1, 3k,5) | (LIB7, 3k,4) | (LIB24, 10k,3) | (LIB16, 3k,3) | (LIB43, 4k,2) | ... | Blank |
| 4 | (LIB9, 1k,5) | (LIB1, 3k,5) | (LIB23, 100k,4) | (LIB24, 10k,3) | (LIB16, 3k,3) | (LIB43, 7k,2) | ... | Blank |
| 5 | (LIB9, 1k,5) | (LIB1, 3k,5) | (LIB3, 50k,4) | (LIB24, 10k,3) | (LIB19, 2k,3) | (LIB43, 5k,2) | ... | Blank |
| ... | ... | ... | ... | ... | Blank | Blank | ... | ... |
| N | (LIB8, 7k,5) | (LIB5, 5k,5) | (LIB13, 1k,4) | (LIB19, 2k,3) | Blank | Blank | ... | Blank |

Remarks: (ID, Charging power (W), Desired electricity rate (yen))

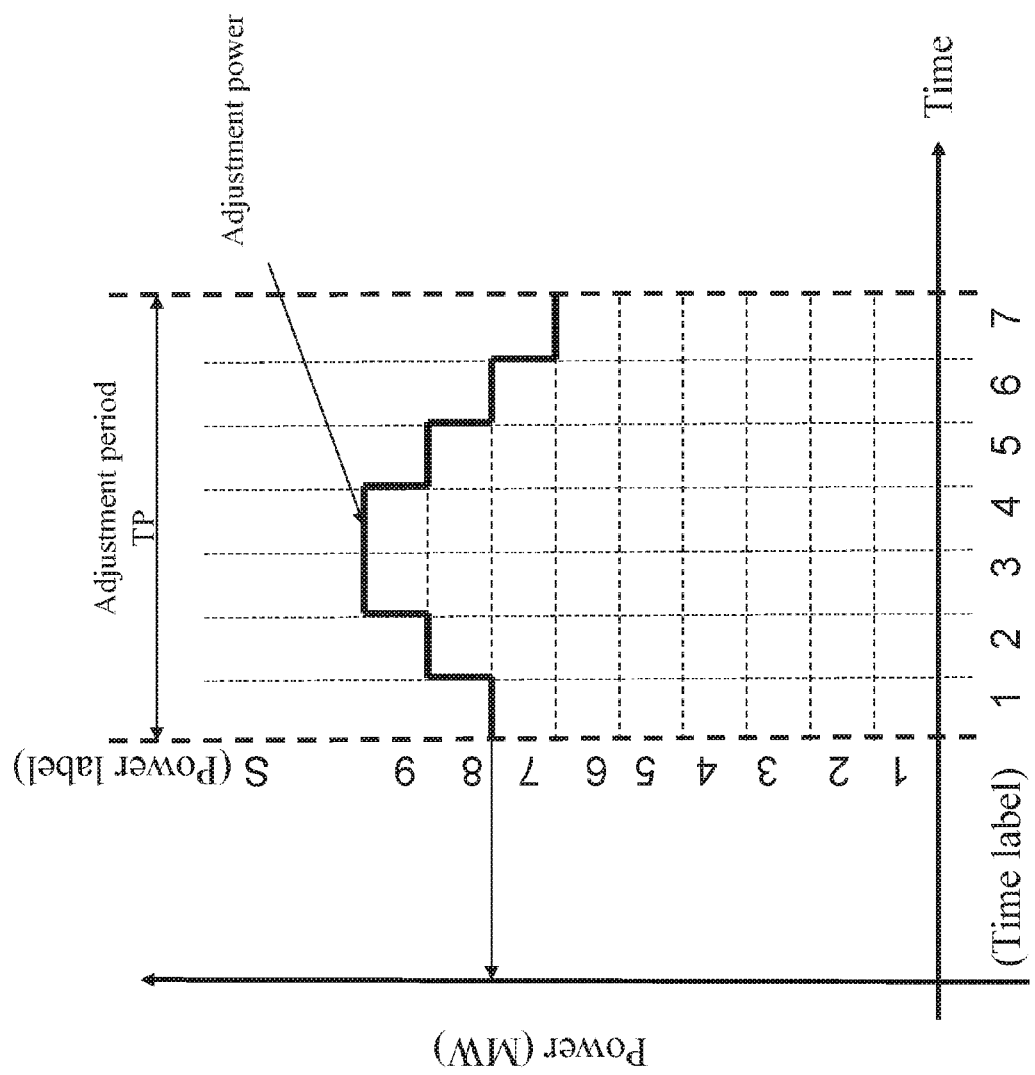
[Fig. 11]

[Fig. 12]

| Label | Period | Electricity rate (kW/yen) | Necessary quantity (Places) |
|---|---|---|---|
| 1 | 12:00 - 12:20 | 5 | 7 |
| 2 | 12:20 - 12:40 | 5 | 8 |
| 3 | 12:40 - 13:00 | 5 | 9 |
| 4 | 13:00 - 13:20 | 5 | 9 |
| 5 | 13:20 - 13:40 | 5 | 8 |
| 6 | 13:40 - 14:00 | 5 | 7 |
| 7 | 14:00 - 14:20 | 5 | 6 |

Remarks: Charging power: Fixed at 3kW

[Fig. 13]

| Time label\Power label | 1 | 2 | 3 | 4 | 5 | 6 | 7 | 8 | 9 |
|---|---|---|---|---|---|---|---|---|---|
| 1 | LIB10 | LIB9 | LIB7 | LIB4 | LIB15 | LIB22 | LIB43 | Fobidden | Fobidden |
| 2 | LIB10 | LIB9 | LIB7 | LIB4 | LIB18 | LIB22 | LIB43 | LIB16 | Fobidden |
| 3 | LIB10 | LIB9 | LIB7 | LIB5 | LIB34 | LIB22 | LIB32 | LIB16 | LIB56 |
| 4 | LIB2 | LIB9 | LIB14 | LIB6 | LIB55 | LIB22 | LIB32 | LIB19 | LIB48 |
| 5 | LIB2 | LIB9 | LIB14 | LIB6 | LIB55 | LIB22 | LIB32 | LIB19 | Fobidden |
| 6 | LIB2 | LIB9 | LIB14 | LIB6 | LIB55 | LIB22 | LIB24 | Fobidden | Fobidden |
| 7 | LIB2 | LIB9 | LIB14 | LIB6 | LIB55 | LIB43 | Fobidden | Fobidden | Fobidden |

Remarks: (ID)

[Fig. 14]
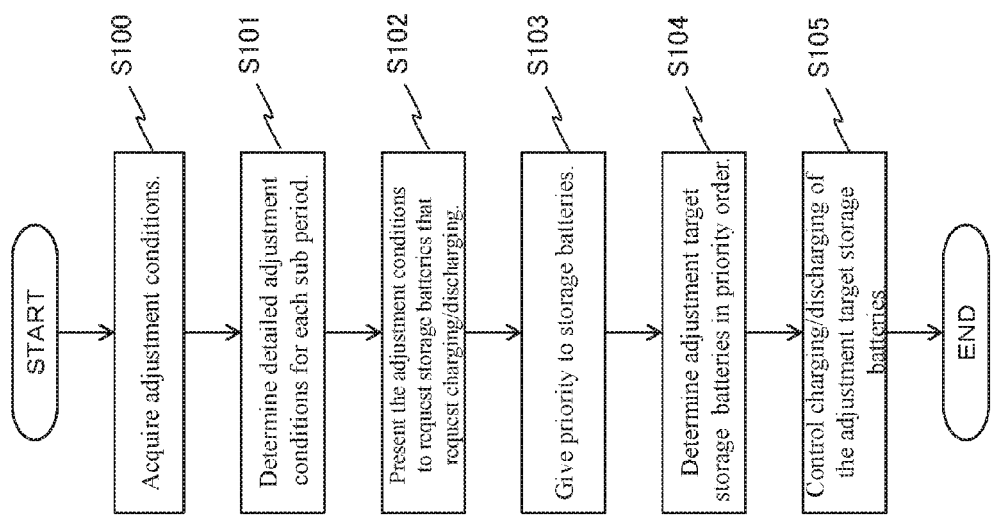

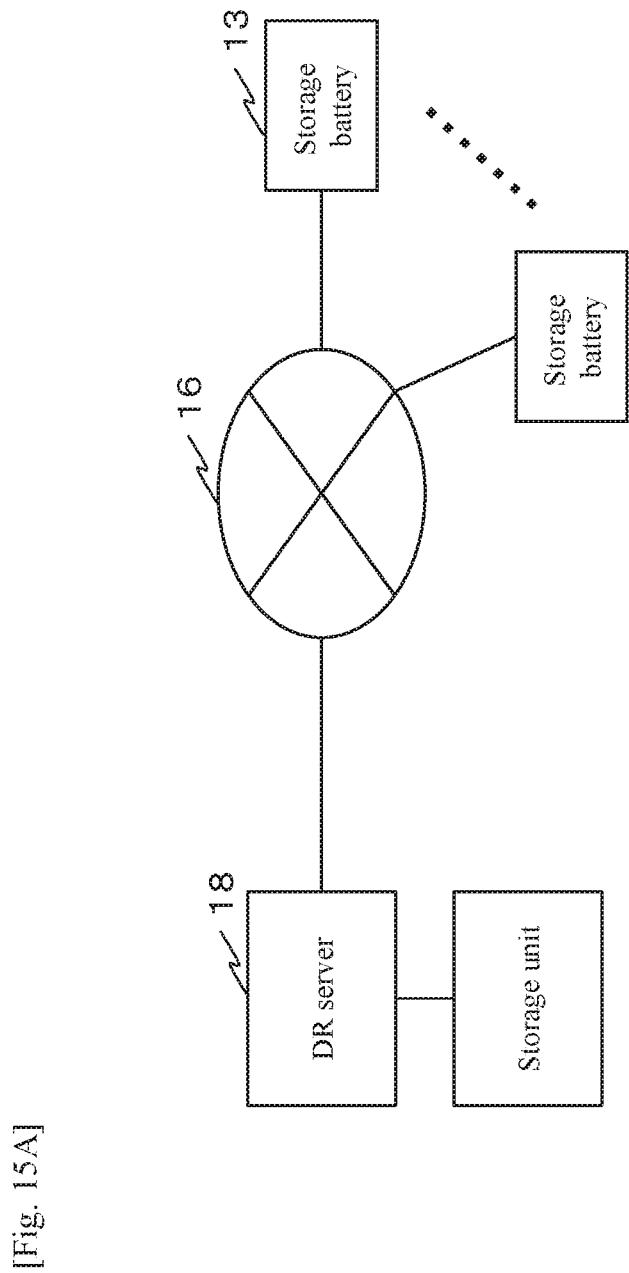
[Fig. 15A]

POWER SUPPLY-DEMAND ADJUSTING APPARATUS, POWER SYSTEM AND POWER SUPPLY-DEMAND ADJUSTING METHOD

CROSS-REFERENCE TO RELATED APPLICATIONS

The present application is a national stage application of International Application No. PCT/JP2014/072300 entitled "Power Supply-Demand Adjusting Apparatus, Power System and Power Supply-Demand Adjusting Method," filed on Aug. 26, 2014, which claims the benefit of priority from Japanese Patent Application No. 2013-191607, filed on Sep. 17, 2013, the disclosures of which are incorporated herein in their entirety by reference thereto.

TECHNICAL FIELD

The present invention relates to a technology for controlling charging and discharging of storage batteries connected to a power grid.

BACKGROUND ART

In a power system in which commercial electric power is supplied to consumers, the power demanded by consumers varies depending on season and time. Accordingly, the maximum supply capacity of the power system is adjusted to the predicted maximum power demand, and when power demand does not reach the predicted maximum value, the power company adjusts electric power to be supplied, by reducing the number of generators to be operated, and/or operating the generators with lowered generation output.

However, maximum supply capacity is required several times a year. That is, the power company has to maintain a maximum supply capacity that will match the maximum value of power demand just for a few times each year and this has caused a problem in which the operation cost of the power system increases.

In contrast, a technology called demand response that controls the balance between supply and demand of electricity according to the need has drawn attention. For example, it is possible to avoid tight power supply and demand conditions by inducing consumers to reduce use of electricity in the time period when the power demand approaches the maximum capacity of the power system, in other words, when a tight balance between supply and demand of electricity is expected. More specifically, in the demand response, in the period during which power supply and demand conditions are tight, a power rate signal that indicates collection of a peak time electricity charge that is higher than the normal rate, a demand response signal that indicates a power saving command for requesting less use of electricity, or the like, are given to consumers so as to induce the consumers to change the set temperature of air conditioners and/or the brightness of lighting apparatus to thereby suppress power consumption. Since use of demand response makes it possible to avoid tight power supply and demand conditions even if the maximum supply capacity is lowered, it is possible to reduce the operating cost of the power system.

However, in the demand response, consumers need to lower the power consumption of electric appliances such as air conditions, lighting apparatus and the like. Lowering power consumption means that it is not possible to maintain a comfortable temperature and not possible to maintain room brightness which reduces consumer comfort in most cases. For this reason, consumers tend to give priority to comfort and neglect using demand response or stop using demand response partway, so that the stability of the power system ends up being lost.

Further, with the recent spread of electric vehicles and power generation equipment such as solar power generation installed in individual consumer's home, consumers who own storage batteries have increased in number. Such storage batteries are used to temporarily store the power generated by solar power generation so that stored power can be used during times when electricity is not generated, or are used to store commercial electricity during time when the electricity rate is low so as to use stored power during time when the electricity rate is high.

For example, Patent Document 1 discloses a technology in which a charging control apparatus for controlling charging of storage batteries selects time periods for charging storage batteries based on the consumption condition of the electricity stored in storage batteries and/or the electricity rate in each time period, to thereby charge the storage batteries in a systematic manner.

RELATED ART DOCUMENTS

Patent Document
  Patent Document 1: Japanese Patent No. 4920123

SUMMARY OF THE INVENTION

Problems to be Solved by the Invention

However, when a technology for controlling charging of storage batteries is applied to demand response, there is a risk of the stability of the power system may be compromised if many customers start to own/use high-capacity storage batteries.

Specifically, since, in general, storage batteries are controlled so as to charge the batteries as quick as possible in a time period when the electricity rate for charging is low, if the electricity rate is uniformly changed depending on the time period on a demand response basis, many storage batteries start charging simultaneously when the electricity rate is lowered. Therefore, if there are many storage batteries connected to the power system, demand for power in the power system ends up varying greatly when the electricity rate is lowered, so that the stability of the power system may be compromised.

Further, although reverse power flow, in which electricity stored in storage batteries is discharged to the power grid for transmitting commercial electricity, has not yet been permitted at present, reverse power flow is considered to be permitted in the future and selling power, or purchase of electricity supplied by reverse power flow by the power company may be introduced. In this case, if the technology for controlling discharging is applied to demand response similarly to the case of controlling the charging of storage batteries, the storage batteries will be controlled to discharge power during times when the price of selling power is high. Therefore, if the price of selling electricity changes uniformly depending on time in the same manner as in the case of charging, many storage batteries would start discharging when the price of selling electricity rises. As a result, if a large number of storage batteries are connected to the power system, power supplied by the power system ends up varying greatly when the price of selling electricity rises, so that the stability of the power system may be compromised.

The object of the present invention is to provide a power supply and demand adjusting apparatus, power system and power supply and demand adjusting method that can improve the stability of a power system.

Means for Solving the Problems

A power supply-demand adjusting apparatus according to the present invention includes:

an acquisition unit that acquires an adjustment period in which power supply and demand is adjusted, and adjustment power which is power to be adjusted in the adjustment period;

an adjustment target determining unit that requests an adjustment target storage battery to be charged or discharged at a predetermined electricity rate in the adjustment period and determines, based on the adjustment power, adjustment target storage batteries from among the storage batteries that have responded to the request; and, a control unit that causes the adjustment target storage batteries to charge or discharge electricity at the predetermined electricity rate in the adjustment period and that causes a non-adjusted storage battery that is different from the adjustment target storage battery to charge or discharge electricity at an electricity rate different from the predetermined electricity rate in the adjustment period.

A power system according to the present invention includes: a storage battery; a charging/discharging control unit to which the storage battery and a power grid are connected and that controls charging and discharging of the connected storage battery; and a power supply-demand adjusting apparatus that adjusts power supply and demand to the power grid, wherein the power supply-demand adjusting apparatus comprises:

an acquisition unit that acquires an adjustment period in which power supply and demand is adjusted, and adjustment power which is power to be adjusted in the adjustment period;

an adjustment target determining unit that requests an adjustment target storage battery to be charged or discharged at a predetermined electricity rate in the adjustment period and determines, based on the adjustment power, adjustment target storage batteries from among the storage batteries that have responded to the request; and, a control unit that causes the adjustment target storage batteries to charge or discharge electricity at the predetermined electricity rate in the adjustment period and that causes a non-adjusted storage battery that is different from the adjustment target storage battery to charge or discharge electricity at an electricity rate different from the predetermined electricity rate in the adjustment period, and wherein the charging/discharging control unit responds to the request instead of the storage battery connected thereto.

A power supply-demand adjusting method according to the present invention includes:

acquiring an adjustment period in which power supply and demand is adjusted, and adjustment power which is power to be adjusted in the adjustment period;

requesting an adjustment target storage battery to be charged or discharged at a predetermined electricity rate in the adjustment period;

determining, based on the adjustment power, adjustment target storage batteries from among the storage batteries that have responded to the request; and, causing the adjustment target storage batteries to charge or discharge electricity at the predetermined electricity rate in the adjustment period and causing a non-adjusted storage battery that is different from the adjustment target storage battery to charge or discharge electricity at an electricity rate different from the predetermined electricity rate in the adjustment period.

Effect of the Invention

According to the present invention, it is possible to improve the stability of a power system.

BRIEF DESCRIPTION OF THE DRAWINGS

FIG. 1 A diagram showing a power system configuration according to the first exemplary embodiment of the present invention.

FIG. 2A A diagram for illustrating a case where a supply and demand planning server determines adjustment conditions for increasing power supply.

FIG. 2B A diagram for illustrating a case where a supply and demand planning server determines adjustment conditions for increasing power supply.

FIG. 3A A diagram for illustrating a case where a supply and demand planning server determines adjustment conditions for increasing power supply.

FIG. 3B A diagram for illustrating a case where a supply and demand planning server determines adjustment conditions for increasing power supply.

FIG. 4 A diagram showing the electricity rate in each time period and adjustment power in an adjustment period.

FIG. 5 A block diagram showing a DR server configuration.

FIG. 6 A diagram for illustrating detailed adjustment conditions determined by an adjustment target determining unit.

FIG. 7 A diagram showing one example of a relationship of electricity rate in each time period.

FIG. 8 A diagram showing one example of detailed adjustment conditions determined by an adjustment target determining unit.

FIG. 9 A diagram showing one example of storage batteries listed in an order of priority.

FIG. 10 A diagram showing another example of storage batteries listed in an order of priority.

FIG. 11 A diagram for illustrating one example of detailed adjustment conditions determined by an adjustment target determining unit when charging power or discharging power is fixed.

FIG. 12 A diagram showing one example of detailed adjustment conditions determined by an adjustment target when charging power is fixed.

FIG. 13 A diagram showing another example of storage batteries listed in an order of priority.

FIG. 14 A flow chart for illustrating power supply and demand adjusting operation of a DR server.

FIG. 15A A diagram for illustrating a method for providing notification of information that shows electricity rates.

MODE FOR CARRYING OUT THE INVENTION

Figure 15B:
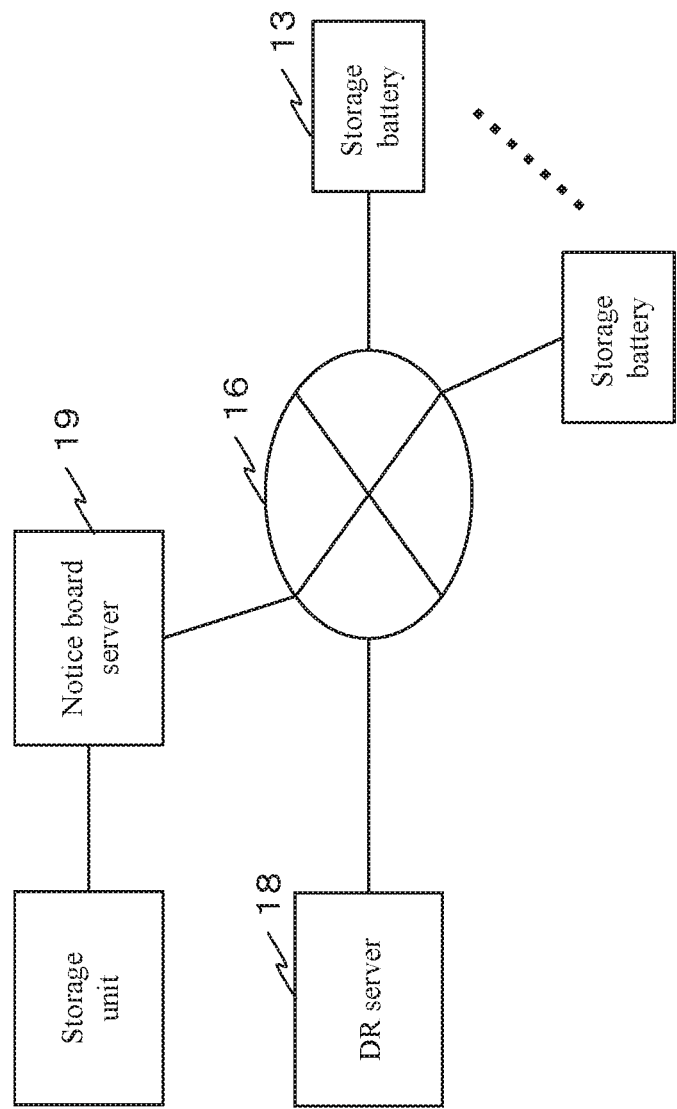
FIG. 15B A diagram for illustrating a method for providing notification of information that shows electricity rates.

Now, the exemplary embodiment of the present invention will be described with reference to the accompanying drawings. In the description and drawings, constituents having the same functions are allotted with the same reference numerals so that repeated explanation may be omitted.

Power system 10 includes generator 11, consuming appliances 12, storage batteries 13, charging/discharging control units 14, power grid 15, communication network 16, supply and demand planning server 17 and DR (Demand Response) server 18.

Generator 11, consuming appliances 12 and charging/discharging control units 14 are connected by power grid 15. The power generated by generator 11 may be consumed as power to drive consuming appliances 12 by way of power grid 15 or may be stored into storage batteries 13 via power grid 15 and charging/discharging control unit 14.

Charging/discharging control units 14, supply and demand planning server 17 and DR server 18 are connected to communication network 16. Part of consuming appliances 12 are also connected to communication network 16.

Generator 11 generates electric power by using a power generating method such as, for example, thermal power generation, hydroelectric power generation, solar power generation, wind power generation, geothermal power generation, ocean temperature difference power generation, nuclear power generation or the like to output the generated electricity to power grid 15. Although, a single generator 11 is illustrated in FIG. 1, actually, in many cases a plurality of generators 11 are connected to power grid 15.

In the present exemplary embodiment, generator 11 includes base power generator 11A that continues to operate keeping a fixed generation output, varying power generator 11B that varies generated output depending on environmental conditions such as air temperature, wind flow rate and the like, and adjustment power generator 11C that generates power for adjustment depending on the difference between the predicted power demand and the sum of the generated outputs of base power generator 11A and varying power generator 11B to adjust the balance between supply and demand. Base power generator 11A is a generator that uses a power generation scheme such as nuclear power generation or the like and that can keep a fixed generation output as planned. Varying power generator 11B is a generator that uses a power generation scheme based on renewable energy such as sunlight, wind power, terrestrial heat or the like. Adjustment power generator 11C is a generator that uses a power generation scheme such as thermal power generation or the like and that is relatively high in response performance. The classification of power generators 11 mentioned herein accord to the utilities of the electricity generated by the power generators 11. Generators 11 of the same power generation scheme may be used for different purposes.

Consuming appliance 12 is a device that is operated by the power supplied from power grid 15. Consuming appliances 12 may be, for example, household electrical appliances such as television sets, refrigerators, washing machines, vacuum cleaners and others. Consuming appliance 12 may include a communication interface that is connected to communication network 16.

Storage battery 13 can charge electricity transmitted via power grid 15 and discharge stored electricity to power grid 15.

Charging/discharging control unit 14 controls charging of storage battery 13 and discharge from storage battery 13 to power grid 15. Specifically, charging/discharging control unit 14 makes plans for charging and discharging between storage battery 13 and power grid 15, based on various conditions such as the electricity rate for each time period, the expected use amount and expected use time of electricity stored in storage battery 13, chargeable and dischargeable time periods or the times when storage battery 13 can charge and discharge. In the present exemplary embodiment, since DR server 18 offers information on the electricity rate in each time period, charging/discharging control unit 14 obtains information on the electricity rate from DR server 18 to make plans for charging and discharging storage battery 13. In the present exemplary embodiment, the electricity rate is the fee to be paid to the power company by the consumer who owns storage battery 13 when storage battery 13 charges electricity, and is the price of selling electricity that the consumer receives from the power company when storage battery 13 discharges electricity. Charging/discharging control unit 14 may be, for example a charger connected to storage battery 13, or may be a computer that is connected to a charger to control the operation of the charger. Further, storage battery 13 and charging/discharging control unit 14 may also be installed in an electric vehicle or a reserve electric source.

Power grid 15 transmits power generated by generator 11 and power discharged from storage battery 13.

Examples of communication network 16 include the internet, LANs (Local Area Networks), inclusive of public telephone lines, Ethernet (registered trademark), wireless communication networks, etc. Communication network 16 transmits application messages output from each charging/discharging controller 14.

Supply and demand planning server 17 includes a power supply and demand predicting function that predicts the power demand in consumer appliances 12 and storage batteries 13 that are connected to power system 10, a supply power planning function that makes plans to supply power of power system 10 and an adjustment condition determining function that determines the conditions under which the power supply and demand of power system 10 is adjusted.

Specifically, supply and demand planning server 17, based on, for example the environmental conditions such as air temperature and the like and the electricity rate, predicts the power demand for every unit period. Supply and demand planning server 17, based on the predicted power demand, makes plans to supply power of power system 10. At this time, supply and demand planning server 17 plans supply power so that the predicted power demand roughly agrees with the supply power. The supply power of power system 10 may include the power generated by base power generator 11A, the power generated by varying power generator 11B and the power generated by adjustment power generator 11C. Supply and demand planning server 17 has a function that predicts the power that can be generated by varying power generator 11B, based on the environmental conditions such as air temperature, wind flow rate and others, and plans the power to be generated by adjustment power generator 11C, based on the first supply power that is the sum of the predicted power, which is the varying supply power, and the base supply power which is the predetermined power generated by the base power generator, and the predicted power demand. More specifically, supply and demand planning server 17 determines the second supply power in accordance with the difference between the power demand and the first supply power.

Supply and demand planning server 17 determines adjustment conditions for adjusting power supply and demand. Specifically, supply and demand planning server 17 determines as adjustment conditions, the adjustment period in which power supply and demand is adjusted and the adjustment power which is the power to be adjusted in the adjustment period. Supply and demand planning server 17 can offer the adjustment conditions including the determined adjustment period and adjustment power to DR server 18.

FIGS. 2A and 2B are diagrams for illustrating a case where supply and demand planning server 17 determines adjustment conditions to increase power demand. FIG. 2A shows electricity supply and a demand curve representing the time-dependent demand power or the power consumed by loads such as consuming appliances 12, storage batteries 13, etc. in one day, before supply and demand planning server 17 adjusts supply and demand of electricity, on a day of a relatively low power demand. Here, in this example, power system 10 includes base power generator 11A, a solar power generator as varying power generator 11B and a thermal power generator as adjustment power generator 11C.

In this case, the power generated by thermal power generators in a predetermined time period is determined so that the sum of the power generated by base power generator 11A and the power generated by the solar power generator corresponds to the predicted power demand, to thereby achieve a balance between supply and demand for power.

However, in first time period TP1 shown in FIG. 2A, the demand power comes down to a level close to the base supply power, hence only a few thermal power generators are being operated in first time period TP1. It takes long time to activate an inactive thermal power generator. Accordingly, in a case where only a few thermal power generators are operating, if one of the adjustment power generators has malfunctioned and has been shut down during an emergency, the power demand will exceed the power being supplied, thus increasing the risk of a power failure.

Further, in second time period TP2 shown in FIG. 2A, the sum of the base supply power and the power generated by solar power generation exceeds the demand power, so that it is impossible for thermal power generation to adjust the balance between supply and demand.

Therefore, in first time period TP1 and second time period TP2, the capability of power system 10 to adjust the balance between supply and demand has deteriorated.

In contrast, as shown in FIG. 2B, supply and demand planning server 17, regarding first time period TP1 and second time period TP2 as adjustment periods, increases power demand by charging storage batteries 13 in these periods. In second time period TP2, supply and demand planning server 17 determines adjustment power so that demand power exceeds the sum of the base supply power and the power generated by solar power generation to charge electricity to storage batteries 13, whereby the thermal power generators are activated, thus making it possible to maintain the balance between supply and demand. Further, in first time period TP1 and second time period TP2, supply and demand planning server 17 determines adjustment power so that the demand power becomes equal to or greater than the predetermined minimum value, whereby it is possible to increase the number of thermal power generators being operated, hence enhance the capability of adjusting the balance between supply and demand and improve stability of power system 10.

FIGS. 3A and 3B are diagrams for illustrating a case in which supply and demand planning server 17 determines adjustment conditions to increase supply power. FIGS. 3A and 3B show supply power and a demand curve on a day when there is a relatively high power demand, hence tight electrical supply-demand conditions are expected, before supply and demand planning server 17 adjusts supply and demand of electricity.

In this example, as shown in FIG. 3A, adjustment power generator 11C for peak demand that will operate only when the power demand approaches the power that can be supplied by the maximum supply capacity of the power system, is operated in third time period TP3.

In contrast to this, as shown in FIG. 3B, when the maximum supply capacity of power system 10 is lower than the power supply capacity comparable to the peak of power demand while the reduction of power supply is compensated for by discharge from storage batteries 13, adjustment power generator 11C that will work only at the peak time of power demand becomes unnecessary, and thus it is possible to cut down the operation cost of power system 10.

In this case, supply and demand planning server 17 can define the period in which demand power exceeds the upper limit of the power for adjustment, as the adjustment period and assume the difference between the demand power and the second supply power as the adjustment power.

Accordingly, supply and demand planning server 17 previously sets a predetermined range for the second supply power, for example, and designates a time period in which the second supply power falls out of the predetermined range, as the adjustment period. In this case, the lower limit of the predetermined range is set based on the power generated by the minimum number of adjustment power generators 11C that can maintain a stable power supply in power system 10. On the other hand, the upper limit of the predetermined range is set based on the maximum value of the power generated by adjustment power generators 11C. When the second supply power falls lower than the predetermined range, supply and demand planning server 17 determines the power to be charged to storage batteries 13 as adjustment power. When the second supply power exceeds the predetermined range, supply and demand planning server 17 determines the power to be discharged from storage batteries 13 as adjustment power.

Supply and demand planning server 17 also determines the electricity rate in each time period. FIG. 4 is a diagram showing the electricity rate in each time period and a planned value of the level of charging power to be charged to storage batteries in adjustment period TP. In the example of FIG. 4, the electricity rate for charging storage batteries 13 is shown. As shown in the upper part in FIG. 4, when determining adjustment period TP, supply and demand planning server 17 sets the second electricity rate for time period TP at b, which is higher than a, the first electricity rate in the non-adjustment period that is the period other than adjustment period TP. Supply and demand planning server 17 offers adjustment conditions including this adjustment period TP, adjustment power, first electricity rate a and second second electricity rate b, to DR server 18.

Returning to FIG. 1, DR server 18, based on the adjustment conditions offered by supply and demand planning server 17, requests candidates of adjustment target storage batteries 13 to be charged to or discharged at the predetermined electricity rate in the adjustment period, and determines, based on the adjustment conditions, adjustment target storage batteries 13 from among the storage batteries that have responded to the request. Here, DR server 18 is owned by the power company or an aggregator or the like that manages the combined demands of many consumers instead of the power company.

FIG. 5 is a block diagram showing the configuration of DR server 18.

DR server 18 includes communication unit 181, storage 182 and CPU (Central Processing Unit) 183.

Communication unit 181 is a communication interface with external devices. Communication unit 181 can connect to charging/discharging control unit 14, supply and demand planning server 17 and others via communication network 16. For example, communication unit 181 receives, from charging/discharging control unit 14, an application message that requests charging or discharging in the adjustment period and the charging/discharging conditions on which storage battery 13 controlled by charging/discharging control unit 14 performs charging or discharging, and outputs the received information to CPU 183. Communication unit 181 also receives adjustment conditions from supply and demand planning server 17 and outputs the information to CPU 183.

Storage 182 stores a program that controls operation of DR server 18, various kinds of data and others to be used to execute the program. The data stored in storage 182 is, for example, the charging/discharging conditions received from charging/discharging control unit 14 and the adjustment conditions received from supply and demand planning server 17.

CPU 183 controls DR server 18. Specifically, CPU 183 reads the program stored in storage 182 and executes the read program to realize the functions of adjustment condition acquisition unit 184, adjustment target determining unit 185, charging/discharging control unit 186 and the like.

Adjustment condition acquisition unit 184 acquires adjustment period TP, in which adjustment of power supply and demand is performed, and adjustment power that is based on the predicted value of power demand in the adjustment period TP. In the present exemplary embodiment, adjustment condition acquisition unit 184 acquires the adjustment conditions determined by supply and demand planning server 17 via communication unit 181 and outputs the acquired adjustment conditions to adjustment target determining unit 185.

Adjustment target determining unit 185 acquires the charging/discharging conditions of storage battery 13 from charging/discharging control unit 14 via communication unit 181 and determines, based on the charging/discharging conditions and the adjustment conditions output by adjustment condition acquisition unit 184, whether or not storage battery 13 is an adjustment target storage battery. In this process, adjustment target determining unit 185 requests candidates of adjustment target storage batteries 13 for charging or discharging in the adjustment period at an electricity rate more advantageous than that for non-adjusted storage battery 13, and determines adjustment target storage batteries 13 from among storage batteries 13 that have responded to the request so that the total of the power to be charged to adjustment target storage batteries 13 or the total of the power to be discharged from adjustment target storage batteries 13 will match the adjustment power in the adjustment period.

Spherically, first, adjustment target determining unit 185 determines more detailed adjustment conditions including the electricity rate in the adjustment period, from the adjustment conditions output from adjustment condition acquisition unit 184.

FIG. 6 is a diagram for illustrating detailed adjustment conditions determined by adjustment target determining unit 185.

Adjustment target determining unit 185 divides adjustment period TP into sub periods of a shorter time, each of which is assigned with a time label to distinguish one from another. Adjustment target determining unit 185, based on the adjustment power indicated by the adjustment conditions obtained from supply and demand planning server 17, determines adjustment power in each sub period. Adjustment target determining unit 185 also determines a predetermined electricity rate applied to charging or discharging of adjustment target storage battery 13 in each sub period. When the adjustment power is a charge of electricity to storage batteries 13, adjustment target determination unit 185 sets third electricity rate c that is the electricity rate applied to charging of adjustment target storage battery 13 in the adjustment period, to be lower than first electricity rate a that is the electricity rate for charging non-adjusted storage battery 13 outside the adjustment period. When the adjustment power is a discharge of electricity from storage battery 13, adjustment target determination unit 185 sets fifth electricity rate e that is the electricity rate for discharging electricity from adjustment target storage battery 13 in the adjustment period, to be higher than fourth electricity rate d that is the electricity rate applied to discharging of non-adjusted storage battery 13.

FIG. 7 is a diagram showing one example of the relationship between electricity rates in each time period. The upper part in FIG. 7 shows the electricity rate when electricity is purchased from power grid 15 (storage battery 13 is charged). When non-adjusted storage battery 13 is charged in a normal way, second electricity rate b in adjustment period TP is higher than first electricity rate a outside the adjustment period. Third electricity rate c when adjustment target storage battery 13 is charged in adjustment period TP, is lower than first electricity rate a. As a result, the relation $c<a<b$ is valid.

The lower part in FIG. 7 shows the electricity rate when electricity is sold to power grid 15 (storage battery 13 is discharged). Fourth electricity rate d when non-adjusted storage battery 13 is discharged is set constant regardless of time, in either adjustment period TP or not, whereas fifth electricity rate e when adjustment target storage battery 13 is discharged in adjustment period TP, is higher than electricity rate d.

The description herein was made by giving an example where the electricity rate is constant in each adjustment period and non-adjustment period, but the invention should not be limited to this example. As long as the magnitude correlation between electricity rates does not vary, the electricity rates need not be constant.

FIG. 8 is a diagram showing detailed adjustment conditions determined by adjustment target determining unit 185.

In this example, adjustment target determining unit 185 divides adjustment period TP into N sub periods of 20 minutes and uniformly sets the electricity rate in each sub period at 5 yen/kWh. The adjustment power in each sub period is a value corresponding to the adjustment power indicated by the adjustment conditions acquired from supply and demand planning server 17.

Then, adjustment target determining unit 185 presents the determined detailed adjustment conditions to each charging/discharging control unit 14 and requests storage batteries 13 for charging or discharging on the presented adjustment conditions. The detailed adjustment conditions herein include sub periods and the electricity rate in each sub period. Charging/discharging control unit 14 plans charging/discharging of storage battery 13, based on the adjustment conditions and the expected use amount and expected time of power stored in storage battery 13. Then, charging/discharging control unit 14, which want to charge/discharge on adjustment target storage battery 13 in the adjustment period, outputs an application message to apply for an adjustment target storage battery. Adjustment target determining unit 185 receives this application message.

The application message includes, for example, the ID for identifying storage battery 13, sub periods during which the storage battery 13 requests charging or discharging and the requested power to be charged or discharged. In this example, adjustment target determining unit 185 sets, as the charging conditions, the sub periods during which charging or discharging has been requested and the power to be charged, in the application message. Further, adjustment target determining unit 185 gives priority to storage batteries 13 that request charging or discharging in each sub period. Adjustment target determining unit 185 may determine the order of priority based on, for example the order of arrival of application messages, or by random selection from storage batteries 13 whose application messages have been accepted up to a predetermined point of time. The method of determining the order of priority of storage batteries 13 at random may be performed by selecting storage batteries 13 one by one at random to determine the order of priority in accordance with the order of selection, or by allotting random numbers to storage batteries 13 and rearranging the batteries in the order of the numbers assigned.

FIG. 9 is a diagram showing one example of charging conditions on storage batteries 13 which have been given priority. Adjustment target determining unit 185, based on the order of priority given for each sub period, determines adjustment target storage batteries 13 from among storage batteries 13 that have applied to be adjustment target storage batteries 13 in the sub period.

Information regarding storage battery 13 shown in FIG. 9 includes the ID of storage battery 13 indicated with "LIB" followed by a number and charging power indicated in "W" unit. For example, storage battery 13 of the first priority in time label 1 has an ID of "LIB9" and requests a charging power of 1 kW.

In a specific method of determining adjustment target storage batteries 13 based on the order of priority, adjustment target determining unit 185 cumulatively adds the charging power of storage batteries 13 from highest priority in each sub period and determines whether or not the cumulative value reaches the planned adjustment power. Adjustment target determining unit 185 determines, as adjustment target storage batteries 13, storage batteries 13 whose priorities are from the highest priority to the priority at which the cumulative value reaches the adjustment power. For example, when the sum of the charging powers of storage batteries 13 of 1st to K-th in priority order reaches the planned adjustment power, adjustment target determining unit 185 designates storage batteries 13 of 1st to K-th in priority order as the adjustment target storage batteries and classifies those other than adjustment target storage batteries 13 as the non-adjusted target storage batteries. Accordingly, storage batteries 13 of (K+1)-th and after and storage batteries 13 that have not requested charging or discharging are excluded as the non-adjusted target storage batteries. When adjustment target storage batteries 13 are determined, adjustment target determining unit 185 notifies storage batteries 13 which have requested charging or discharging about whether or not the battery is adjustment target storage battery 13.

FIG. 10 is a diagram showing another example of charging conditions on storage batteries 13 which have been given priority. In this example, the application message further includes the desired electricity rate for charging or discharging, in addition to the ID of storage battery 13, sub periods during which storage battery 13 requests charging and discharging and the charging or discharging power requested by storage battery 13. The desired electricity rate herein is presented by the price per 1 kWh. In this case, adjustment target determining unit 185 can determine the order of priority based on the desired electricity rate. For example, in the example of FIG. 10, adjustment target determining unit 185 gives an order of priority to storage batteries 13 that requests charging, in the order of the highest desired electricity rate for each sub period. Adjustment target determining unit 185, similarly to the example of FIG. 9, determines adjustment target storage batteries 13 from among storage batteries 13 that have requested charging in each sub period, based on the order of priority.

In the examples shown in FIGS. 9 and 10, the charging power or discharging power is different between individual storage batteries 13 and the application message includes the desired level of charging power or discharging power. However, it is also possible to set the charging power or discharging power for storage battery 13 at a constant value.

FIG. 11 is a diagram for illustrating one example of detailed adjustment conditions determined by adjustment target determining unit 185 when charging power or discharging power is fixed.

As shown in FIG. 11, when charging power or discharging power is fixed, adjustment target determining unit 185 can use the necessary number of storage batteries 13 as the adjustment conditions, instead of adjustment power in each sub period.

FIG. 12 is a diagram showing one example of detailed adjustment conditions determined by adjustment target determining unit 185 when charging power is fixed. Adjustment target determining unit 185 evenly sets the electricity rate for every storage battery 13 at 5 yen per 1 kWh, and determines the necessary number of storage batteries 13 to be charged or discharged in each sub period, based on the adjustment power and charging power indicated by the adjustment conditions obtained from supply and demand planning server 17.

Then, adjustment target determining unit 185 notifies each charging/discharging control unit 14 of the determined detailed adjustment conditions and requests adjustment target storage batteries 13 that can charge or discharge electricity under the presented adjustment conditions. In response to this, charging/discharging control unit 14, based on the presented adjustment conditions and the expected use amount and expected use time of electricity stored in storage battery 13, plans charging/discharging of storage battery 13. Then, charging/discharging control unit 14, which is desirous of charging/discharging as adjustment target storage battery 13 in the adjustment period, outputs an application message to apply for an adjustment target storage battery. Adjustment target determining unit 185 receives this application message.

The application message includes the ID for identifying storage battery 13 that requests charging or discharging and sub periods during which this storage battery 13 requests charging or discharging. In this example, the level of charging power or discharging power is fixed so that the application message does not need to include the requested charging power or discharging power. Adjustment target determining unit 185 gives priority to storage batteries 13 that request charging or discharging in each sub period. Adjustment target determining unit 185 determines the order of priority based on, for example, the order of arrival of application messages.

FIG. 13 is a table listing storage batteries 13 which have been given priority. In this example, the necessary number of storage batteries 13 is determined when adjustment conditions are determined. Further, since the order of priority is given in accordance with the order of arrival of application messages, the table of FIG. 13 holds the determined necessary number of IDs for each sub period. In the part of the table which exceeds the necessary number, the value "forbidden" is previously stored so that IDs cannot be hold. Adjustment target determining unit 185, based on the order of priority for every sub period, determines adjustment target storage batteries 13 from among storage batteries 13 that requests charging or discharging in each sub period. In this example, adjustment target determining unit 185 selects the necessary number of storage batteries 13 as adjustment target storage batteries 13 in priority order.

Description follows returning to FIG. 5.

Charging/discharging control unit 186 causes adjustment target storage batteries 13 selected by adjustment target determining unit 185 to charge or discharge during the target sub periods for adjustment. Specifically, in the present exemplary embodiment, since storage battery 13 is charged or discharged in the period planned by charging/discharging control unit 14 that is connected to this storage battery 13, in accordance with the notified electricity rate, charging/discharging control unit 186 can indirectly control charging and discharging of adjustment target storage battery 13 by notifying the electricity rate of storage battery 13. For example, when storage battery 13 is designated to be the adjustment target for charging power, the electricity rate for charging this storage battery 13 in the sub period is set lower than that of the other period of time. Accordingly, charging/discharging control unit 14 that has obtained the information showing this electricity rate controls charging of storage battery 13 so as to charge electricity during the target sub period for adjustment.

FIG. 14 is a flow chart to illustrate to a power supply and demand adjusting operation of DR server 18.

First, adjustment condition acquisition unit 184 in DR server 18 acquires adjustment conditions from supply and demand planning server 17. Adjustment condition acquisition unit 184 notifies adjustment target determining unit 185 of the acquired adjustment conditions (Step S100). Here, the adjustment conditions obtained from supply and demand planning server 17 include an adjustment period and adjustment power.

Then, upon receiving the adjustment conditions acquired by adjustment condition acquisition unit 184, adjustment target determining unit 185, based on the adjustment conditions, determines detailed adjustment conditions for each sub period (Step S101). Specifically, adjustment target determining unit 185, based on the information on the adjustment period included in the received adjustment conditions, determines sub periods by dividing the adjustment period into subdivisions. Then, adjustment target determining unit 185 determines the adjustment power and electricity rate for each sub period to create detailed adjustment conditions.

Subsequently, adjustment target determining unit 185 presents the determined detailed adjustment conditions to request storage batteries 13 that request charging/discharging (Step S102). Thus, application messages that request charging/discharging of storage battery 13 with sub-divided time are transmitted to DR server 18.

Upon receiving the application messages, adjustment target determining unit 185 gives priority to storage batteries 13 that request charging/discharging (Step S103). At this stage, adjustment target determining unit 185 can give priority to storage batteries 13 in accordance with the order of reception of application messages. Further, adjustment target determining unit 185 may also determine the order of priority using random numbers.

Adjustment target determining unit 185, based on the determined order of priority, determines adjustment target storage batteries from among storage batteries 13 that request charging/discharging (Step S104). Specifically, when charging/discharging power is not fixed, adjustment target determining unit 185 cumulatively adds charging/discharging power of storage batteries 13 sequentially in order of priority, and judges whether or not the cumulative value reaches the planned adjustment power. Adjustment target determining unit 185 determines, as adjustment target storage batteries 13, storage batteries 13 whose priorities are from the highest priority to the priority when the cumulative value reaches the adjustment power. When the charging power or discharging power is fixed, adjustment target determining unit 185 designates the necessary number of storage batteries 13 in order of priority as adjustment target storage batteries 13.

Subsequently, charging/discharging control unit 186 controls charging/discharging of adjustment target storage batteries 13 (Step S105). Specifically, charging/discharging control unit 186 indirectly controls charging/discharging of the adjustment target storage batteries 13, by lowering the electricity rate for charging, and by raising the electricity rate for discharging, in target sub periods for adjustment.

As described above, according to the present exemplary embodiment, adjustment target storage batteries that will charge or discharge electricity at a predetermined electricity rate in an adjustment period in which power supply and demand is adjusted, are requested. Then, from among the storage batteries that responded to the request, adjustment target storage batteries for adjustment are determined based on the adjustment power. The determined adjustment target storage batteries are made to charge or discharge electricity in the adjustment period, at an electricity rate different from that of the non-adjusted storage battery. This makes it possible to reduce the electricity rate in the adjustment period only for the number of storage batteries that match the adjustment power, and differentiate the time during which the electricity rate becomes advantageous between the adjustment target storage battery and the non-adjusted storage battery, whereby time for charging or discharging can be dispersed. As a result, it is possible to improve stability of the power system.

In the exemplary embodiment, as the electricity rate for the non-adjusted storage battery, a first electricity rate at which the non-adjusted storage battery is charged in the period other than the adjustment period and a second electricity rate that is the electricity rate at which the non-adjusted storage battery is charged in the adjustment period and that is higher than the first electricity rate, are acquired. Further, adjustment target storage batteries are requested on condition that the predetermined electricity rate when the adjustment target storage battery is charged in the adjustment period, is set at a third electricity rate that is lower than the first electricity rate. Accordingly, the third electricity rate is lower than the first and second electricity rates, hence the owners of storage batteries can get an advantageous electricity rate when offering the storage batteries as adjustment targets, hence the owners become ready to offer their storage batteries for power adjustment purposes. As a result, it is possible to make the stability of the power system more reliable.

In the exemplary embodiment, as the electricity rate for the non-adjusted storage battery, a fourth electricity rate at which the non-adjusted storage battery is discharged is acquired. Further, adjustment target storage batteries are requested on condition that the predetermined electricity rate when the adjustment target storage battery is discharged in the adjustment period, is set at a fifth electricity rate that is higher than the fourth electricity rate. Accordingly, the owners of storage batteries can get an advantageous electricity rate when offering there storage batteries as adjustment targets, hence the owners become ready to offer their storage batteries for power adjustment purposes. As a result, it is possible to make the stability of the power system more reliable.

In the exemplary embodiment, the charging power or discharging power of the non-adjusted storage battery is set at a fixed value, as many storage batteries as the number determined depending on the adjustment power are selected as the adjustment target storage batteries. As a result, it is possible to determine the adjustment target storage batteries from among the applicant storage batteries without calculating the sum of charging power or discharging power based on the charging power or discharging power of individual storage batteries. Accordingly, it is possible to reduce the amount of computation that is needed to determine the adjustment target storage batteries.

In the exemplary embodiment, tender prices of electricity rate for charging or discharging are received individually from multiple storage batteries, so that adjustment target storage batteries are determined based on the tender prices. As a result, since charging or discharging of the storage batteries can be done at prices according to the balance between supply and demand of electricity, it is possible to easily obtain the applications of storage batteries that are needed to adjust the power for the adjustment electricity, thus making it possible to make the stability of the power system more reliable.

In the exemplary embodiment, the adjustment period is divided into a plurality of sub periods, and the adjustment target storage battery is determined for each sub period. This makes it possible to request adjustment target storage batteries in shorter units of time. When a storage battery is connected to the power grid and adjustment target storage batteries are requested in a period of time during which charging or discharging can be carried out, the storage battery can apply to this request. Accordingly, use of a shorter unit of time to request adjustment target storage batteries makes it easy for storage batteries to apply to the request, hence making it possible to make the stability of the power system more reliable. Further, since more storage batteries can be selected as the adjustment target storage batteries, the electricity rate for the adjustment target storage batteries can be applied to a greater number of storage batteries, hence it is possible to prevent feeling unfairness.

In the exemplary embodiment, the supply power includes a first supply power determined depending on environmental conditions and a second supply power for adjustment in accordance with the difference between the predicted demand power and the first supply power, and the adjustment period is defined as a time period in which the second supply power exceeds a predetermined range. In the time period in which the second supply power exceeds the predetermined range, for example, when the second supply power lowers the lower limit of the predetermined range, the adjustment target storage batteries are made to charge electricity in the adjustment period, and, for example, when the second supply power exceeds the upper limit of the predetermined range, the adjustment target storage batteries are made to discharge electricity in the adjustment period. Accordingly, power demand can be increased by charging storage batteries when power demand is so low that the power system may lose stability, whereas power supply can be increased by discharging of storage batteries when power demand is so high that the power system may lose stability. Thus, it is possible to make the stability of the power system more reliable.

Although the present invention has been explained with reference to the exemplary embodiment, the present invention should not be limited to the above exemplary embodiment. Various modifications that can be understood by those skilled in the art may be made to the structures and details of the present invention within the scope of the present invention.

For example, although in the above exemplary embodiment DR server 18 proposes the electricity rate, the present invention should not be limited to this example. FIGS. 15A and 15B are diagrams for illustrating noticing methods of information on the electricity rate. In the above exemplary embodiment, DR server 18 presents a noticing information including the electricity rate, as shown in FIG. 15A. In contrast to this, notice board server 19 separate from DR server 18 may be provided as shown in FIG. 15B. In this case, charging/discharging controller 186 of DR server 18, upon generating information on the electricity rate for each storage battery 13, transmits the generated information to notice board server 19 as notice information. Notice board server 19, in accordance with a request from charging/discharging controller 14, provides notice information indicating the electricity rate for each storage battery 13.

In the above exemplary embodiment DR server 18 indirectly causes storage battery 13 to charge or discharge electricity by notifying the electricity rate to charging/discharging controller 14 connected to storage battery 13. However, the present invention should not be limited to this. For example, DR server 18 may be adapted to directly control charging or discharging of storage battery 13.

Further, though in the above exemplary embodiment supply and demand planning server 17 and DR server 18 are devices separated from each other, the present invention should not be limited to this example. For example, supply and demand planning server 17 and DR server 18 may be provided as an integrated device. Or, part of the functions of supply and demand planning server 17 and DR server 18 may be realized on another server device.

Here, computer programs for realizing individual functions of DR server 18 according to the above exemplary embodiment can be prepared and installed in a personal computer or the like. It is also possible to provide a computer-readable recording medium storing such computer programs. Examples of recording mediums include magnetic discs, optical discs, magneto-optical discs, flush memories and the like. The above computer programs may be distributed via, for example a network or the like without using any recording medium.

Part or all of each of the above each exemplary embodiment is described in the following appendixes, but the invention should not be limited to these.

APPENDIX 1

A power supply-demand adjusting apparatus, comprising:
an acquisition unit that acquires an adjustment period in which power supply and demand is adjusted, and adjustment power which is power to be adjusted in the adjustment period;
an adjustment target determining unit that requests an adjustment target storage battery to be charged or discharged at a predetermined electricity rate in the adjustment period and determines, based on the adjustment power, adjustment target storage batteries from among the storage batteries that have responded to the request; and, a control unit that causes the adjustment target storage batteries to charge or discharge electricity at the predetermined electricity rate in the adjustment period and that causes a non-adjusted storage battery that is different from the adjustment target storage battery to charge or discharge electricity at an electricity rate different from the predetermined electricity rate in the adjustment period.

APPENDIX 2

The power supply-demand adjusting apparatus according to Appendix 1, wherein
the storage battery is made to charge or discharge electricity in a period of time that is planned by a charging/discharging control unit connected to the storage battery in accordance with an electricity rate that is notified, and
the control unit notifies the charging/discharging control unit connected to the adjustment target storage battery, of a predetermined electricity rate as the electricity rate in the adjustment period, and notifies the charging/discharging control unit connected to the non-adjusted storage battery, of an electricity rate that is different from the predetermined electricity rate as the electricity rate in the adjustment period.

APPENDIX 3

The power supply-demand adjusting apparatus according to Appendix 1 or 2, wherein
the acquisition unit acquires, as the electricity rate for the non-adjusted storage battery, a first electricity rate as the electricity rate for the non-adjusted storage battery in the adjustment period and a second electricity rate that is lower than the first electricity rate as the electricity rate for charging the non-adjusted storage battery in a period other than the adjustment period, and,
the adjustment target determining unit requests the adjustment target storage battery on condition that the predetermined electricity rate is set at a third electricity rate that is lower than the second electricity rate to be applied for charging the adjustment target storage battery in the adjustment period.

APPENDIX 4

The power supply-demand adjusting apparatus according to Appendix 1 or 2, wherein
the acquisition unit acquires, as the electricity rate for the non-adjusted storage battery other than the adjustment targets, a fourth electricity rate as the electricity rate for discharging storage batteries other than the adjustment targets, and
the adjustment target determining unit invites the adjustment target storage batteries on condition that the predetermined electricity rate is set at a fifth electricity rate that is higher than the fourth electricity rate to be applied for discharging the adjustment target storage batteries in the adjustment period.

APPENDIX 5

The power supply-demand adjusting apparatus according to any one of Appendixes 1 to 4, wherein the adjustment target determining unit sets the charging power or discharging power of the adjustment target storage battery at a fixed value and determines for the adjustment target storage batteries, as many storage batteries as the number determined depending on the adjustment power and the fixed value.

APPENDIX 6

The power supply-demand adjusting apparatus according to any one of Appendixes 1 to 5, wherein the adjustment target determining unit collects tenders of the electricity rate for charging or discharging electricity, from each of the storage batteries that have responded to the request and determines the adjustment target storage batteries from among the storage batteries that have responded to the request, based on the tender price.

APPENDIX 7

The power supply-demand adjusting apparatus according to any one of Appendixes 1 to 6, wherein the adjustment target determining unit divides the adjustment period into a plurality of sub periods and determines the adjustment target storage batteries for each of the sub periods.

APPENDIX 8

The power supply-demand adjusting apparatus according to any one of Appendixes 1 to 7, wherein power including a first supply power determined depending on environmental conditions and a second supply power for adjustment in accordance with the difference between a predicted demand power and the first supply power is supplied, and
the adjustment period is defined as a period for time in which the second supply power exceeds a predetermined range.

APPENDIX 9

The power supply-demand adjusting apparatus according to Appendix 8, wherein when the second supply power is lower than a lower limit of the predetermined range, the acquisition unit acquires power to be charged to the adjustment target storage battery as the adjustment power, and when the second supply power exceeds a upper limit of the predetermined range, the acquisition unit acquires power to be discharged from the adjustment target storage battery as the adjustment power.

APPENDIX 10

A power system comprising: a storage battery; a charging/discharging control unit to which the storage battery and a power grid are connected and that controls charging and discharging of the connected storage battery; and a power supply-demand adjusting apparatus that adjusts power supply and demand to the power grid, wherein the power supply-demand adjusting apparatus comprises:
an acquisition unit that acquires an adjustment period in which power supply and demand is adjusted, and adjustment power which is power to be adjusted in the adjustment period;
an adjustment target determining unit that requests an adjustment target storage battery to be charged or discharged at a predetermined electricity rate in the adjustment period and determines, based on the adjustment power, adjustment target storage batteries from among the storage batteries that have responded to the request; and, a control unit that causes the adjustment target storage batteries to charge or discharge electricity at the predetermined electricity rate in the adjustment period and that causes a non-adjusted storage battery that is different from the adjustment target storage battery to charge or discharge electricity at an electricity rate different from the predetermined electricity rate in the adjustment period, and wherein the charging/discharging control unit responds to the request instead of the storage battery connected thereto.

APPENDIX 11

The power system according to Appendix 10, wherein
the charging/discharging control unit plans of a time period in which the storage battery is charged or discharged, in accordance with an electricity rate that is notified, and,
the control unit notifies the electricity rate to the charging/discharging control unit to cause the adjustment target storage batteries to charge or discharge electricity in the adjustment period.

APPENDIX 12

A power supply-demand adjusting method, comprising:
acquiring an adjustment period in which power supply and demand is adjusted, and adjustment power which is power to be adjusted in the adjustment period;
requesting an adjustment target storage battery to be charged or discharged at a predetermined electricity rate in the adjustment period;
determining, based on the adjustment power, adjustment target storage batteries from among the storage batteries that have responded to the request; and,
causing the adjustment target storage batteries to charge or discharge electricity at the predetermined electricity rate in the adjustment period and causing a non-adjusted storage battery that is different from the adjustment target storage battery to charge or discharge electricity at an electricity rate different from the predetermined electricity rate in the adjustment period.

This application claims priority based on Japanese Patent Application No. 2013-191607, filed on Sep. 17, 2013, and should incorporate all the disclosure thereof herein.

DESCRIPTION OF REFERENCE NUMERALS

10 power system
11 generator
12 consumer appliance
13 storage battery
14 charging/discharging control unit
15 power grid
16 communication network
17 supply and demand planning server
18 DR server
181 communicator
182 storage
183 CPU
184 adjustment condition acquisition unit (acquisition unit)
185 adjustment target determining unit
186 charging/discharging control unit (control unit)

What is claimed is:

1. A power supply-demand adjusting apparatus, comprising:
    an acquisition unit that acquires an adjustment period in which power supply and demand is adjusted, and adjustment power which is power to be adjusted in the adjustment period;
    an adjustment target determining unit that sends, to storage batteries, a request for an adjustment target storage battery to be charged or discharged at a predetermined electricity rate in the adjustment period and determines, based on the adjustment power, adjustment target storage batteries from among the storage batteries that have responded to the request that requests the adjustment target storage battery; and
    a control unit that causes the adjustment target storage batteries to charge or discharge electricity at the predetermined electricity rate in the adjustment period and that causes a non-adjusted storage battery that is different from the adjustment target storage battery to charge or discharge electricity at an electricity rate different from the predetermined electricity rate in the adjustment period.

2. The power supply-demand adjusting apparatus according to claim 1, wherein
    the storage battery is made to charge or discharge electricity in a period of time that is planned by a charging/discharging control unit connected to the storage battery in accordance with an electricity rate that is notified, and
    the control unit notifies the charging/discharging control unit connected to the adjustment target storage battery, of a predetermined electricity rate as the electricity rate in the adjustment period, and notifies the charging/discharging control unit connected to the non-adjusted storage battery, of an electricity rate that is different from the predetermined electricity rate as the electricity rate in the adjustment period.

3. The power supply-demand adjusting apparatus according to claim 1, wherein
    the acquisition unit acquires, as the electricity rate for the non-adjusted storage battery, a first electricity rate as the electricity rate for the non-adjusted storage battery in the adjustment period and a second electricity rate that is lower than the first electricity rate as the electricity rate for charging the non-adjusted storage battery in a period other than the adjustment period, and,
    the adjustment target determining unit requests the adjustment target storage battery on condition that the predetermined electricity rate is set at a third electricity rate that is lower than the second electricity rate to be applied for charging the adjustment target storage battery in the adjustment period.

4. The power supply-demand adjusting apparatus according to claim 1, wherein
    the acquisition unit acquires, as the electricity rate for the non-adjusted storage battery other than the adjustment targets, a fourth electricity rate as the electricity rate for discharging storage batteries other than the adjustment targets, and
    the adjustment target determining unit invites the adjustment target storage batteries on condition that the predetermined electricity rate is set at a fifth electricity rate that is higher than the fourth electricity rate to be applied for discharging the adjustment target storage batteries in the adjustment period.

5. The power supply-demand adjusting apparatus according to claim 1, wherein the adjustment target determining unit sets the charging power or discharging power of the adjustment target storage battery at a fixed value and determines for the adjustment target storage batteries, as many storage batteries as the number determined depending on the adjustment power and the fixed value.

6. The power supply-demand adjusting apparatus according to claim 1, wherein the adjustment target determining unit collects tenders of the electricity rate for charging or discharging electricity, from each of the storage batteries that have responded to the request and determines the adjustment target storage batteries from among the storage batteries that have responded to the request, based on the tender price.

7. The power supply-demand adjusting apparatus according to claim 1, wherein the adjustment target determining unit divides the adjustment period into a plurality of sub periods and determines the adjustment target storage batteries for each of the sub periods.

8. The power supply-demand adjusting apparatus according to claim 1, wherein power including a first supply power determined depending on environmental conditions and a second supply power for adjustment in accordance with the difference between a predicted demand power and the first supply power is supplied, and
the adjustment period is defined as a period for time in which the second supply power exceeds a predetermined range.

9. A power system comprising:
a storage battery;
a charging/discharging control unit to which the storage battery and a power grid are connected and that controls charging and discharging of the connected storage battery; and
a power supply-demand adjusting apparatus that adjusts power supply and demand to the power grid,
wherein the power supply-demand adjusting apparatus comprises:
an acquisition unit that acquires an adjustment period in which power supply and demand is adjusted, and adjustment power which is power to be adjusted in the adjustment period;
an adjustment target determining unit that sends, to storage batteries, a request for an adjustment target storage battery to be charged or discharged at a predetermined electricity rate in the adjustment period and determines, based on the adjustment power, adjustment target storage batteries from among the storage batteries that have responded to the request that requests the adjustment target storage battery; and
a control unit that causes the adjustment target storage batteries to charge or discharge electricity at the predetermined electricity rate in the adjustment period and that causes a non-adjusted storage battery that is different from the adjustment target storage battery to charge or discharge electricity at an electricity rate different from the predetermined electricity rate in the adjustment period, and
wherein the charging/discharging control unit responds to the request instead of the storage battery connected thereto.

10. A power supply-demand adjusting method, comprising:
acquiring an adjustment period in which power supply and demand is adjusted, and adjustment power which is power to be adjusted in the adjustment period;
sending, to storage batteries, a request for an adjustment target storage battery to be charged or discharged at a predetermined electricity rate in the adjustment period;
determining, based on the adjustment power, adjustment target storage batteries from among the storage batteries that have responded to the request that requests the adjustment target storage battery; and
causing the adjustment target storage batteries to charge or discharge electricity at the predetermined electricity rate in the adjustment period and causing a non-adjusted storage battery that is different from the adjustment target storage battery to charge or discharge electricity at an electricity rate different from the predetermined electricity rate in the adjustment period.

* * * * *